United States Patent

Tsutsumi et al.

[11] Patent Number: 5,998,501
[45] Date of Patent: Dec. 7, 1999

[54] PROCESS FOR PRODUCING AQUEOUS INK FOR INKJET PRINTING

[75] Inventors: Tekehiro Tsutsumi; Koji Azuma; Michitaka Sawada, all of Wakayama, Japan

[73] Assignee: Kao Corporation, Tokyo, Japan

[21] Appl. No.: 09/017,222

[22] Filed: Feb. 2, 1998

[30] Foreign Application Priority Data

Feb. 7, 1997 [JP] Japan ................................ 9-024678

[51] Int. Cl.$^6$ ..................... C09D 11/02; C08F 220/56; C08F 283/12; C08F 216/12; C08F 218/02
[52] U.S. Cl. ..................... 523/160; 525/479; 525/279; 525/312; 525/309; 526/279; 526/307.5; 526/307.7; 106/31.27; 106/31.57
[58] Field of Search ..................... 523/160, 161; 106/31.13, 31.25, 31.27, 31.32, 31.33, 31.57; 525/479, 279, 312, 287, 309, 475; 526/307.5, 307.7, 276, 279

[56] References Cited

U.S. PATENT DOCUMENTS

| | | |
|---|---|---|
| 4,105,615 | 8/1978 | Balatan . |
| 4,246,154 | 1/1981 | Yao . |
| 4,471,079 | 9/1984 | Enami ..................... 523/161 |
| 4,692,188 | 9/1987 | Ober et al. . |
| 4,963,189 | 10/1990 | Hindagolla . |
| 4,981,902 | 1/1991 | Mitra et al. ..................... 324/547 |
| 5,166,276 | 11/1992 | Hayama et al. ..................... 525/329.7 |
| 5,428,101 | 6/1995 | Urano et al. ..................... 524/521 |
| 5,594,067 | 1/1997 | Doi et al. ..................... 524/806 |
| 5,852,074 | 12/1998 | Tsutsumi et al. ..................... 523/161 |
| 5,877,235 | 3/1999 | Sakuma et al. . |

FOREIGN PATENT DOCUMENTS

| | | |
|---|---|---|
| 0 739 959 | 10/1996 | European Pat. Off. . |
| 55-18412 | 2/1980 | Japan . |
| 62-95366 | 5/1987 | Japan . |
| 4-28776 | 1/1992 | Japan . |
| 4-189876 | 7/1992 | Japan . |
| 4-261478 | 9/1992 | Japan . |
| 4-359071 | 12/1992 | Japan . |
| 4-359072 | 12/1992 | Japan . |

*Primary Examiner*—Vasu Jagannathan
*Assistant Examiner*—Callie E. Shosho
*Attorney, Agent, or Firm*—Oblon, Spivak, McClelland, Maier & Neustadt, P.C.

[57] ABSTRACT

A process for producing an aqueous ink for inkjet printing capable of giving an elevated print density of printed matters, being improved in fixability to the material to be printed, water resistance and improved storage stability and scarcely scorching onto a printer head. This process comprises dissolving a salt-forming group-having polymer and a hydrophobic dye in a water-insoluble organic solvent to obtain a solution, adding water and a neutralizing agent optionally together with a surfactant to the solution to ionize the salt-forming group of the polymer, emulsifying the resulting mixture, and removing out the solvent from the emulsion to obtain an ink containing an aqueous dispersion of the polymer particles in which the dye has been encompassed.

11 Claims, No Drawings

PROCESS FOR PRODUCING AQUEOUS INK FOR INKJET PRINTING

TECHNICAL FIELD TO WHICH THE INVENTION BELONGS

This invention relates to a process for producing an aqueous ink capable of giving an elevated print density of printed matters and being excellent in the fixability to the material to be printed and water resistance. More particularly, it relates to a process for producing an aqueous ink for inkjet printing which have a further improved water resistance and can prevent scorching onto a printer head.

PRIOR ART

An inkjet printing system is a printing system which comprises jetting ink drops through a very fine nozzle directly onto a printing material and fixing thereon to thereby obtain letters or images. As the ink-jetting systems, there have been widely employed a piezoelectric system with the use of a piezoelectric element for a printer head and a heat jet system with the use of a heater of a heating resistance element. In the inks to be employed in these systems, it has been a practice to use water-soluble dyes in order to prevent the clogging of nozzles. Although the clogging of the nozzles with inks can be almost completely prevented by using these water-soluble dyes, there arise some problems such that the inks are poor in water resistance and, particularly in the case of the heat jet system, the dyes are oxidized by the excessive heat on the printer head and thus the inks are liable to be scorched on the printer head.

To improve the water resistance of inks for inkjet printing, it has been proposed to use pigments as inks (JP-A 4-28776, 4-189876, 4-359071 and 4-359072), to use non-aqueous solvents (JP-A 4-261478), to use dyes excellent in water resistance (U.S. Pat. No. 4,963,189), etc.

However, it is feared that the use of pigments as inks would result in such problems as a decrease in the chroma of printed matters and clogging in nozzles. In this case, furthermore, the inks are insufficient in the fixability to the materials to be printed such as paper and OHP sheets, which worsens the capability of the printed matters of saving the records. None of other methods proposed hitherto can provide any ink meeting the demands for both of the water resistance and fixability.

Further, JP-A 55-18412 has disclosed the blend of a latex with an ink so as to improve the water resistance, while JP-A 62-95366, which corresponds to U.S. Pat. No. 4,692,188, has suggested the use of an ink wherein an oily dye has been incorporated into a polymer with the use of a surfactant, etc., though no salt-forming group-having polymer is disclosed therein.

When a latex is used, there arise some problems such as serious scorching onto the printer head and clogging in the nozzle too. When the dye is incorporated into a polymer with the use of a surfactant, the polymer has a large particle size and thus the dispersion thereof is insufficient in stability. In this case, furthermore, the dye is incorporated into the polymer particles only at a low ratio, which makes it difficult to achieve any satisfactory print density. That is to say, this method fails to give any ink meeting the demands for the prevention of scorching, stability and print density.

DISCLOSURE OF THE INVENTION

Accordingly, it is an object of the present invention to provide a process for producing an aqueous ink for inkjet printing capable of giving an elevated print density of printed matters, having an improved fixability to the material to be printed, an improved water resistance and an improved storage stability and scarcely scorching onto a printer head.

To achieve the above-mentioned object, the present inventors have conducted extensive studies and, as a result, found out that an ink containing an aqueous dispersion of polymer particles obtained by a specific method, in which a hydrophobic dye has been encompassed achieves a sufficient print density, has an improved water resistance and can suppress scorching onto a printer head, thus completing the present invention.

The invention provides a process for producing an aqueous ink for inkjet printing, which comprises the steps of dissolving a salt-forming group-having polymer and a hydrophobic dye in a water-insoluble, organic solvent to obtain a solution, adding water and a neutralizing agent to the solution to ionize the salt-forming group-having polymer, emulsifying the resulting mixture, and removing out the solvent from the emulsion to obtain an aqueous dispersion of the polymer particles in which the dye has been encompassed.

A preferable example of the salt-forming group-having polymer is a vinyl polymer obtained by copolymerizing at least one monomer (a) selected from the group consisting of a silicone macromer represented by the following formula (1), an acrylamide monomer and a methacrylamide monomer, excluding those having salt-forming groups, with a salt-forming group-having polymerizable unsaturated monomer (b) and a monomer (c) copolymerizable with the above-mentioned monomers:

$$X(Y)_n Si(R)_{3-m}(Z)_m \qquad (1)$$

wherein X represents a polymerizable unsaturated group; Y represents a divalent bonding group; the plurality of Rs may be the same or different and each represents a hydrogen atom, a lower alkyl group, an aryl group or an alkoxy group; Z represents a monovalent siloxanepolymer group having a number-average molecular weight of at least about 500; n is 0 or 1; and m is an integer of 1 to 3.

It is preferable that the salt-forming group is —COOH.

The process of the present invention sometimes involves the additional step of adding a surfactant together with water and a neutralizing agent.

In other words, the present invention provides a profess for producing an aqueous ink for inkjet printing characterized by dissolving a salt-forming group-having polymer and a hydrophobic dye in a water-insoluble organic solvent, adding water and a neutralizing agent optionally together with a surfactant to the obtained solution to thereby ionize the salt-forming group in the polymer, then emulsifying the mixture thus obtained and removing out the solvent from the emulsion to obtain an ink containing an aqueous dispersion of the polymer particles in which the dye has been encompassed.

DETAILED DESCRIPTION OF THE INVENTION

Now, the modes of the embodiment of the present invention will be described in detail.

As the salt-forming group-having polymer to be used in the present invention, it is preferable to use a vinyl polymer obtained by copolymerizing at least one monomer selected from the group consisting of a silicone macromer represented by the above formula (1), an acrylamide monomer and a methacrylamide monomer, excluding those having salt-forming groups, with a salt-forming group-having polymerizable unsaturated monomer and a monomer copolymerizable with the above-mentioned monomers in the presence of a radical polymerization initiator.

In the silicone macromer represented by the above formula (1) to be used in the present invention, X represents a polymerizable unsaturated group and particular examples thereof include $CH_2=CH-$ and $CH_2=C(CH_3)-$ and Y represents a divalent bonding group. Particular examples thereof include $-COO-$, $-COOC_bH_{2b}$ (wherein b represents a number of 1 to 5) and a phenylene group and $-COOC_3H_6$ is preferable therefor. R represents a hydrogen atom, a lower alkyl group such as a methyl or ethyl group, an aryl group such as a phenyl group or an alkoxy group such as a methoxy group, among which a methyl group is preferable therefor. Z represents a monovalent siloxanepolymer group having a number-average molecular weight of at least about 500, preferably a monovalent dimethylsiloxane polymer having a number-average molecular weight of from 800 to 5,000. n is 0 or 1, preferably 1. m is an integer of 1 to 3, preferably 1.

Examples of these silicone macromers include compounds represented by the following formulae (1-1) to (1-4).

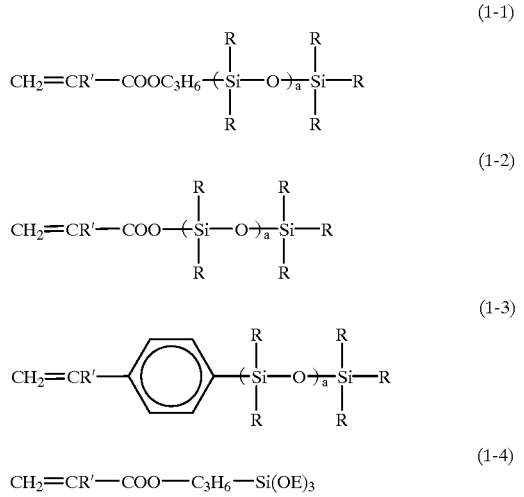

wherein R' represents a hydrogen atom or a methyl group; Rs may be the same or different and each has the meaning as defined above; E represents a group of the following formula:

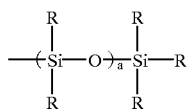

and a is a number of 5 to 65.

Among these compounds, those represented by the formula (1-1) are preferable. In particular, a silicone macromer FM-0711 (mfd. by Chisso Corp.) having the structure represented by the following formula (1-1-1) is preferable therefor.

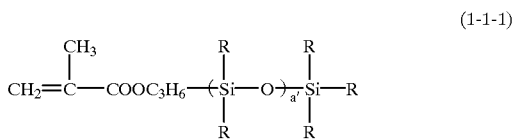

wherein a' is a number capable of giving a weight-average molecular weight of 1,000.

Examples of the acrylamide or methacrylamide monomers [hereinafter referred to simply as (meth) acrylamide monomers] having no salt-forming group to be used in the present invention include acrylamide monomers such as acrylamide, N-(1,1-dimethyl-3-oxobutyl)acrylamide (diacetone acrylamide), N,N-dimethylacrylamide, N,N-diethylacrylamide, N,N-diisopropylacrylamide, N,N-dibutylacrylamide, N,N-diphenylacrylamide, N-t-butylacrylamide, N-t-hexylacrylamide, N-t-octylacrylamide, N-(1-methylundecyl)-acrylamide, N-isobornylacrylamide, N-norbornylacrylamide, N-adamantylacrylamide, N-benzylacrylamide, N-(4-methylphenyl)methylacrylamide, N-diphenylacrylamide, phtalimidomethylacrylamide, acrylamidohydroxyacetic acid, 3-acrylamido-3-methylbutanoic acid, 10-acrylamidoundecylic acid, N-(2,2,2-trichloro-1-hydroxy)ethylacrylamide, N-(1,1,3,5-tetramethyl) octylacrylamide, N-(1,5-dimethyl-1-ethyl)hexylacrylamide, N-isopropylacrylamide, N-methylol-acrylamide, N-cyclohexylacrylamide, N-(1,1,3-trimethyl)-butylacrylamide and methacrylamide monomers such as methacrylamide, N-(1,1-dimethyl-3-oxobutyl) methacrylamide, N N-dimethylmethacrylamide N,N-diethylmethacrylamide, N,N-diisopropylmethacrylamide, N,N-dibutylmethacrylamide, N,N-diphenylmethacrylamide, N-t-butylmethacrylamide, N-t-hexylmethacrylamide, N-t-octylmethacrylamide, N-(1-methylundecyl) methacrylamide, N-isobornylmethacrylamide, N-norbornylmethacrylamide, N-adamantylmethacrylamide, N-benzylmethacrylamide, N-(4-methylphenyl) methylmethacrylamide, N-diphenylmethacrylamide, phtalimidomethyhlmethacrylamide, methacrylamidohydroxyacetic acid, 3-methacrylamido-3-methylbutanoic acid, 10-methacrylamidoundecylic acid, N-(2,2,2-trichloro-1-hydroxy)ethylmethacrylamide, N-(1,1,3,5-tetramethyl) octylmethacrylamide, N-(1,5-dimethyl-1-ethyl) hexylmethacrylamide, N-isopropylmethacrylamide, N-methylolmethacrylamide, N-cyclohexylmethacrylamide and N-(1,1,3-trimethyl)butylmethacrylamide, though the present invention is not restricted thereto.

Examples of the salt-forming group-having, polymerizable unsaturated monomer to be used in the present invention include cationic monomers such as unsaturated tertiary amine-containing monomers and unsaturated ammonium salt-containing monomers. Particular examples thereof include monovinylpyridines such as vinylpyridine, 2-methyl-5-vinylpyridine and 2-ethyl-5-vinylpyridine; styrenes having dialkylamino groups such as N,N-dimethylaminostyrene and N,N-dimethylaminomethylstrytene; esters having dialkylamino groups of acrylic or methacrylic acid such as N,N-dimethylaminoethyl acrylate, N,N-dimethylaminoethyl methacrylate, N,N-dimethylaminopropyl acrylate and N,N-diethylaminopropyl methacrylate; vinyl ethers having dialkylamino groups such as 2-dimethylaminoethyl vinyl ether; acrylamides or methacrylamides having dialkylamino groups such as N-(N',N'-dimethylaminoethyl)acrylamide, N-(N',N'-dimethylaminoethyl)methacrylamide, N-(N',N'- diethylaminoethyl)acrylamide, N-(N',N'-diethylaminoethyl)-methacrylamide, N-(N',N'-dimethylaminopropyl)acrylamide, N-(N',N'-dimethylaminopropyl)methacrylamide, N-(N',N'-diethylaminopropyl)acrylamide and N-(N',N'-diethylaminopropyl)methacrylamide; and compounds having been quaternized with known quaternizing agents such as $C_{1-4}$ alkyl halides. Examples of the anionic monomers include unsaturated carboxylic acid monomers, unsaturated sulfonic acid monomers and unsaturated phosphoric acid monomers. Particular examples thereof include unsaturated carboxylic acid monomers such as acrylic acid, methacrylic acid, crotonic acid, itaconic acid, maleic acid, fumaric acid, citraconic acid, 2-methacryloyloxymethylsuccinic acid and anhydrides and salts thereof; unsaturated sulfonic acid monomers such as styrenesulfonic acid, 2-acrylamido-2-methylpropanesulfonic acid, 3-sulfopropyl (meth)acrylate, bis(3-sulfopropyl)-itaconate and salts thereof, 2-hydroxyethyl(meth) acrylic acid monosulfate; and unsaturated phosphoric acid monomers such as vinylphosphonic acid, vinyl phosphate, bis (methacryloxyethyl) phosphate, diphenyl 2-methacryloyloxy ethyl phosphate, dibutyl-2-acryloyloxyethyl phosphate and dioctyl 2-(meth) acryloyloxyethyl phosphate.

Examples of the monomers copolymerizable with the above-mentioned monomers to be used in the present invention include acrylates such as methyl acrylate, ethyl acrylate, isopropyl acrylate, n-butyl acrylate, t-butyl acrylate, isobutyl acrylate, n-amyl acrylate, isoamyl acrylate, n-hexyl acrylate, 2-ethylhexyl acrylate, n-octyl acrylate, decyl acrylate and dodecyl acrylate; methacrylates such as methyl methacrylate, ethyl methacrylate, isopropyl methacrylate, n-butyl methacrylate, t-butyl methacrylate, isobutyl methacrylate, n-amyl methacrylate, isoamyl methacrylate, n-hexyl methacrylate, 2-ethylhexyl methacrylate, n-octyl methacrylate, decyl methacrylate and dodecyl methacrylate; styrenic monomers such as styrene, vinyltoluene, 2-methylstyrene and chlorostyrene; hydroxyl group-containing acrylates and methacrylates such as 2-hydroxyethyl acrylate, 3-hydoxypropyl acrylate, 2-hydroxyethyl methacrylate and 3-hydroxypropyl methacrylate; vinyl macromers consisting of vinyl polymers having a polymerizable functional group at one end; polyester macromers consisting of polyesters having a polymerizable functional group at one end; polyurethane macromers consisting of polyurethanes having a polymerizable functional group at one end; and polyalkyl ether macromers consisting of polyalkyl ethers having a polymerizable functional group at one end.

The copolymerizable monomer to be used in the present invention is not restricted to the above-mentioned ones and commercially available radical-copolymerizable monomers are also usable therefor. From the viewpoint of the storage stability of the dispersion, however, it is preferable to use one of the compounds selected from those represented by the following formulae (2-1) to (2-4) or a combination of two or more of the same.

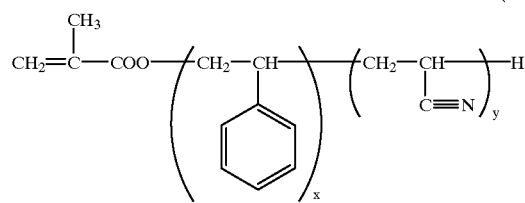

(2-1)

wherein x and y represent numbers capable of giving a ratio of x/y of from 6/4 to 10/0 and a weight-average molecular weight of from 1,000 to 10,000.

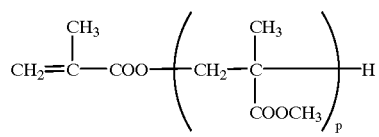

(2-2)

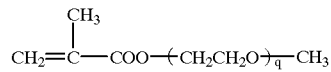

(2-3)

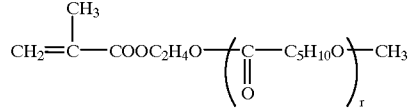

(2-4)

wherein p, q and r represent numbers capable of giving a weight-average molecular weight of from 500 to 10,000.

As the compounds represented by the above formulae (2-1) to (2-4), use can be also made of commercially available ones. Examples of these compounds include styrene and/or acrylonitrile copolymer macromers having a methacryloyloxy group at one end (AN-6 and AS-6 mfd. by Toa Gosei Chemical Industry, Co., Ltd.), a methyl methacrylate macromer having a methacryloyloxy group at one end (AA-6 mfd. by Toa Gosei Chemical Industry, Co., Ltd.), polyoxyethylene macromers having a methacryloyloxy group at one end (NK Esters M-90 Gnew, M-40 Gnew and M-20 Gnew mfd. by Shin-Nakamura Kagaku K.K.), and a polyester macromer having a methacryloyloxy group at one end (FM4DX mfd. by Daicel Chemical Industries, Ltd.).

It is preferable in the present invention that the above-mentioned vinyl polymer is produced by copolymerizing 1 to 40% by weight, based on all the monomers, of one or more monomers selected from the group consisting of the silicone macromer represented by the above formula (1) and (meth)acrylamide monomers, 3 to 25% by weight, based on all the monomers, of a salt-forming group-having, polymerizable monomer and 35 to 96% by weight, based on all the monomers, of other monomer(s).

In the present invention, the vinyl polymer can be produced by copolymerizing the above-mentioned monomers by known polymerization methods, for example, bulk polymerization, solution polymerization, suspension polymerization or emulsion polymerization. It is particularly preferable to produce the vinyl polymer by the solution polymerization method. As the solvent to be used in the solution polymerization method, use can be made of publicly known organic solvents exemplified by aliphatic alcohols such as ethanol and propanol; ketones such as acetone and methyl ethyl ketone; esters such as ethyl acetate; and aromatic solvents such as benzene and toluene. Either one of these organic solvents or a mixture of two or more thereof may be employed.

As the radical polymerization initiator to be employed in the above-mentioned polymerization, it is preferable to use, for example, azo compounds such as 2,2'-azobisisobutyronitrile, 2,2'-azobis(2,4-dimethylvaleronitrile), 2,2'-azobis(4-methoxy-2,4-dimethylvaleronitrile), dimethyl 2,2'-azobisbutyrate, 2,2'-azobis(2-methylbutyronitrile) and 1,1'-azobis(1-cyclohexanecarbonitrile). Alternatively, use can be made therefor of organic peroxides such as t-butyl peroctylate, dicumyl peroxide, di-t-butyl peroxide and dibenzoyl peroxide. Such an initiator is preferably used in an amount of 0.001 to 2.0% by mol, still preferably 0.01 to 1.0% by mol, based on the monomer mixture.

Further, a polymerization chain transfer agent may be added in the above-mentioned polymerization. Particular examples of the polymerization chain transfer agent usable therein include mercaptans such as octylmercaptan, n-dodecylmercaptan, t-dodecylmercaptan, n-hexadecylmercaptan, n-tetradecylmercaptan and t-tetradecylmercaptan; xanthogen disulfides such as dimethylxanthogen disulfide, diethylxanthogen disulfide and diisopropylxanthogen disulfide; thiuram disulfides such as tetramethylthiuram disulfide, tetraethylthiuram disulfide and tetrabutylthiuram disulfide; halogenated hydrocarbons such as carbon tetrachloride and ethylene bromide; hydrocarbons such as pentaphenylethane; acrolein, methacrolein, allyl alcohol, 2-ethylhexyl thioglycolate, terpinolene, α-terpinene, γ-terpinene, dipentene, α-methylstyrene dimers (preferably those containing at least 50% by weight of 2,4-diphenyl-4-methyl-1-pentene); unsaturated cyclic hydrocarbons such as 9,10-dihydroanthracene, 1,4-dihydronaphthalene, indene and 1,4-cyclohexadiene; and unsaturated heterocyclic compounds such as xanthene and 2,5-dihydofuran. Either one of these compounds or a mixture of two or more thereof may be employed.

The polymerization is usually effected at 30 to 100° C., preferably 50 to 80° C., for 1 to 10 hours, though the polymerization conditions may be appropriately selected depending on the radical polymerization initiator, the monomers, the solvents, etc. The polymerization is preferably effected in an inert gas atmosphere such as nitrogen gas.

After the completion of the polymerization, the copolymer thus produced can be isolated from the reaction mixture by a publicly known procedure such as reprecipitation or solvent removal. The obtained copolymer may be purified by removing the unreacted monomers therefrom by repeated reprecipitation, membrane separation, chromatography, extraction, etc.

It is preferable from the viewpoints of the prevention of scorching on a printer head, the durability of the ink after printing and the formation of a dispersion that the vinyl polymer thus obtained has a weight-average molecular weight of from 3,000 to 80,000, preferably 3,000 to 50,000.

It is also preferable that the above-mentioned vinyl polymer has a Tg measured with a differential scanning calorimeter (DSC) of at least 20° C. in the case of the inkjet printing system with the use of a piezoelectric element, or at least 30° C. in the case of the inkjet printing system with the use of heat energy. It is particularly preferable that the Tg ranges from 40 to 150° C. in both of the piezoelectric element and heat energy systems. When the vinyl polymer has a Tg below the lower limit as specified above, there sometimes arises the problem of ink-transfer, when paper sheets printed with the aqueous ink of the present invention are laid one top of another.

The hydrophobic dye to be used in the present invention is not particularly restricted, so long as it can be encompassed within the salt-forming group-having polymer particles obtained in the above-mentioned manner. For example, use can be made theref or of oily dyes, disperse dyes, direct dyes, acid dyes and basic dyes. Among all, it is particularly preferable to use oily dyes and disperse dyes which can be well encompassed within the polymer particles.

Preferable examples of the oily dyes to be used in the present invention include C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35 and 70; C.I. Solvent Green 3 and 7; and C.I. Solvent Orange 2, though the present invention is not restricted thereto. Particularly preferable examples thereof include C.I. Solvent Yellow 29 and 30 as yellow dyes, C.I. Solvent Blue 70 as a cyan dye, C.I. Solvent Red 18 and 49 as magenta dyes, C.I. Solvent Black 3 and nigrosine dyes as black dyes. Commercially available examples of these dyes include Nubian Black PC-0850, Oil Black HBB, Oil Black 860, Oil Yellow 129, Oil Yellow 105, Oil Pink 312, Oil Red 5B, Oil Scarlet 308, Vali Fast Blue 2606, Oil Blue BOS (mfd. by Orient Co., Ltd.), Neopen Yellow 075, Neopen Magenta SE1378, Neopen Blue 808, Neopen Blue FF4012 and Neopen Cyan FF4238 (mfd. by BASF).

Preferable examples of the disperse dyes to be used in the present invention include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9, though the present invention is not restricted thereto.

It is preferable that the hydrophobic dye to be used in the present invention can be dissolved in a water-insoluble organic solvent at a ratio of 2 g/l or more, still preferably from 20 to 500 g/l, from the viewpoint that it is efficiently encompassed within the salt-forming group-having polymer particles in the synthesis method as will be described hereinafter.

In the present invention, it is also possible that various hydrophobic stabilizers are dissolved together with the hydrophobic dye in the water-insoluble organic solvent to thereby encompass these stabilizers within the polymer. As the stabilizers, use can be made of, for example, UV absorbers such as salicylate, benzophenone, benzotriazole and cyanoacrylate compounds; primary antioxidants such as hindered phenol and amine compounds; secondary antioxidants such as phosphorus and sulfur compounds; and UV stabilizers such as hindered amine compounds, though the present invention is not restricted thereto.

In the present invention, the dye is encompassed within the salt-forming group-having polymer particles in the following manner. First, the salt-forming group-having polymer and the hydrophobic dye are dissolved in the water-insoluble organic solvent. In this step, it is preferable form the viewpoint of giving a highly stable aqueous dispersion to dissolve from 1 to 30 parts by weight of the salt-forming group-having polymer and from 1 to 60 parts by weight of the hydrophobic dye in 100 parts by weight of the water-insoluble organic solvent.

As the water-insoluble organic solvent to be used in the present invention, it is preferable to employ those having a solubility in water of 3% by weight or less. Particular examples thereof include aromatic solvents such as benzene and toluene; aliphatic solvents such as heptane, hexane and cyclohexane; and halogenated aliphatic solvents such as methylene chloride, 1,1,1-trichloroethane, chloroform, carbon tetrachloride and 1,2-dichloroethane. When a hydrophilic solvent having a solubility in water exceeding 3% by weight such as methyl ethyl ketone or acetone is employed, crystals of the dye are precipitated in the step of the emulsification as will be described hereinbelow, which makes it difficult to obtain any stable emulsion.

Next, a neutralizing agent and water are added to the above-mentioned solution of the salt-forming group-having polymer and the hydrophobic dye in the water-insoluble organic solvent to thereby ionize the salt-forming group in the polymer. In this step, surfactant(s) may be further added, if necessary. As the neutralizing agent, use can be made of publicly known acids or bases, depending on the type of the salt-forming group. As the acids, use can be made of, for example, inorganic acids such as hydrochloric acid and sulfuric acid, or organic acids such as acetic acid, propionic acid, lactic acid, succinic acid and glycolic acid. As the bases, use can be made of, for example, a tertiary amine such as trimethylamine, triethylamine, monomethanolamine, diethanolamine and triethanolamine, ammonia, sodium hydroxide or potassium hydroxide, though the present invention is not restricted thereto. Although the degree of the neutralization is not particularly restricted, it is preferable to effect the neutralization so that the obtained aqueous dispersion becomes weakly basic or neutral.

It is preferable in the present invention to add water in an amount of from 150 to 1,000 parts by weight per 100 parts by weight of the above-mentioned water-insoluble organic solvent.

The surfactant to be added in the present invention is not particularly restricted. For example, use can be made of anionic surfactants such as those selected from the group consisting of alkylbenzenesulfonates, alkylnaphthalenesulfonates, alkane- or olefinsulfonates, alkylsulfate salts, polyoxyethylene alkyl or aryl ether sulfate salts, alkyl phosphate salts, alkyl diphenyl ether disulfonates, ether carboxylates, alkyl sulfosuccinates, α-sulfo-aliphatic fatty acid esters and fatty acid salts, higher fatty acid/amino acid condensates and naphtenates. Preferable examples of anionic surfactants include alkylbenzenesulfonates and polyoxyethylene alkyl ether sulfates. Either one of these surfactants or a combination of two or more thereof may be used. As cationic surfactants, use can be made of, for example, aliphatic amine salts, quaternary ammonium salts, sulfonium salts and phosphonium salts. Either one of these surfactants or a combination of two or more thereof may be used. As nonionic surfactants, use can be made of, for example, polyoxyethylene alkyl ethers, polyoxyethylene alkylaryl ethers, sorbitan fatty acid esters, polyoxyethylene sorbitan fatty acid esters, polyoxethylene sorbitol fatty acid esters, glycerol fatty acid esters, polyoxyethylene fatty acid esters and alkyl(poly)-glycosides. Preferable examples of nonionic surfactants include polyoxyethylene alkyl ethers. Either one of these surfactants or a combination of two or more thereof may be used.

Subsequently, the mixture obtained by ionizing the salt-forming group in the above-mentioned manner is emulsified and the water-insoluble organic solvent is removed from the obtained emulsion optionally together with a definite amount of water to thereby give an aqueous dispersion of the polymer particles in which the hydrophobic dye has been encompassed having a definite concentration of the solid matters.

In the present invention, the emulsification is preferably effected to such an extent as to disperse the water-insoluble organic solvent with a particle size of about 0.1 to 0.5 μm. Any emulsifier may be used in the present invention without restriction, so long as it can give a particle size within the scope as defined above. Use can be made therefor of commonly employed ones such as an ultrasonic emulsifier, an ultra-high-pressure homogenizer and a membrane emulsifier. Preferable examples thereof include a Microfluidizer (mf d. by Microfluidizer), a Nanomizer (mfd. by Tokushu Kika Kogyo K.K.) and an Ultrasonic Homogenizer (mfd. by Nippon Seiki Seisakusho).

Although the conditions for the removal of the water-insoluble organic solvent are not particularly restricted in the present invention, it is preferable that the water-insoluble organic solvent is evaporated at 20 to 100° C., preferably 30 to 60° C. When the water-insoluble organic solvent is not completely removed in this step, there sometimes arises a problem that the surface tension of the dispersion is lowered and the aqueous ink for inkjet printing blurs seriously.

The particle size of the polymer particles having the hydrophobic dye encompassed therein preferably ranges from 0.01 to 0.5 μm, still preferably from 0.02 to 0.3 μm. When the particle size is less than 0.01 μm, the ink blurs. When the particle size exceeds 0.5 μm, it is feared that the stability of the dispersion is deteriorated thereby. Thus, it is preferable that the particle size falls within the range as specified above.

In the aqueous dispersion of the polymer particles having the hydrophobic dye encompassed therein obtained in the present invention, the content of the hydrophobic dye preferably ranges from 50 to 200% by weight, still preferably from 75 to 150% by weight, based on the salt-forming group-having polymer. The encompassment of the hydrophobic dye can be ascertained by, for example, the absence of any insoluble dye crystal in the highly colored aqueous phase of the ink. Further, the spectral characteristics of the ink are equivalent to those of a solution of the same dye in an organic solvent, which indicates that the coloration is caused by the dye encompassed within the solid polymer phase.

In the aqueous ink obtained by the process of the present invention, the content of the aqueous dispersion of the polymer particles having the hydrophobic dye encompassed therein preferably ranges from 1 to 30% by weight, still preferably from 2 to 15% by weight, more preferably 2 to 10% by weight, in term of the solid matters. When the solid content is less than 1% by weight, only insufficient print density can be achieved. When it exceeds 30% by weight, the evaporation of the ink at the nozzle tip causes thickening or aggregation of the ink particularly in an ink jet printer, which sometimes leads to clogging of the nozzle. It is therefore preferable that the content of the aqueous dispersion falls within the range as specified above.

The process for producing an aqueous ink of the present invention is superior to the conventionally employed phase inversion emulsification methods with the use of self-emulsifiable resins in the following points. That is, in the process of the present invention, a highly hydrophobic dye is usable, the hydrophobic dye can be encompassed within a polymer at a very high ratio and the acid value of the employed polymer can be regulated to a low level so as to give a highly stable dispersion.

After forming an aqueous dispersion of polymer particles having a hydrophobic dye encompassed therein by the above-mentioned method, it is possible in the process of producing an aqueous ink of the present invention to further add various publicly known additives, if necessary. Examples of these additives include wetting agents such as polyhydric alcohols and amino acids, dispersants, defoaming agents such as silicone compounds, surface tension regulators such as cationic, anionic or nonionic surfactants, mildewproofing agents such as chloromethylphenol and/or chelating agents such as EDTA and oxygen scavengers such as sulfites.

Examples of the above-mentioned wetting agents include glycols such as ethylene glycol, propylene glycol, diethylene glycol, triethylene glycol, tetraethylene glycol and polyethylene glycol; glycerol; polyhydric alcohol ethers such as diethylene glycol diethyl ether, diethylene glycol dibutyl ether, ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether and propylene glycol monomethyl ether; acetates; thioglycol; nitrogen-containing compounds such as N-methyl-2-pyrrolidone, 1,3-dimethyl-imidazolidinone, triethanolamine, formamide and dimethylformamide; dimethyl sulfoxide; and amino acids such as N-methylglycine, arginine and glutamic acid, though the present invention is not restricted thereto. Either one of these wetting agents or a combination of two or more thereof may be used. Although the content of the wetting agent is not particularly restricted, it is preferably contained in an amount of 0.1 to 30% by weight, still preferably 0.1 to 20% by weight, in the aqueous ink of the present invention.

The dispersants are not particularly restricted. Use can be made of anionic, nonionic or cationic dispersants therefor, so long as the stability of the aqueous dispersion of the polymer is not deteriorated thereby.

The defoaming agents are not particularly restricted too. From the viewpoints of inhibiting the foaming in the preparation of the ink and regulating the surface tension of the ink, it is preferable to use compounds represented by the following formula (3):

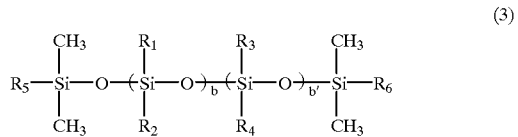

(3)

whrerin $R_1$, $R_2$, $R_3$ and $R_4$ are the same or different and each represents a $C_{1-10}$ alkyl or aryl group; $R_5$ and $R_6$ are the same or different and each represents a $C_{1-10}$ alkyl or aryl group or a hydroxyl, amino, carboxyl or epoxy group; and b and b' are the same or different and each represents an integer of from 0 to 1,000, preferably from 1 to 1,000.

Examples of the compounds represented by the above formula (3) include KF96, 66, 69, KS68, 604, 607A, 602, 603, KM73, 73A, 73E, 72, 72A, 72C, 72F, 82F, 70, 71, 75, 80, 83A, 85, 89, 90, 68-1F and 68-2F (mfd. by Shin-Etsu Silicone Co., Ltd.).

Although the content of the defoaming agent is not particularly restricted, it is preferably contained in an amount of 0 to 2.0% by weight in the aqueous ink for inkjet printing of the present invention. When the content of the defoaming agent exceeds 2.0% by weight, foaming can be inhibited but cissing occurs in the ink in printing, which sometimes deteriorates the printing qualities. Accordingly, it is preferable that the content of the defoaming agent falls within the range as specified above.

By considering the jetting stability when employed, in particular, in an ink jet printer, it is preferable that the aqueous ink obtained by the process of the present invention. has a viscosity at 20° C. of from 0.5 to 5 cp, still preferably from 1 to 3 cp.

From the viewpoint of the penetration into the material to be printed, it is preferable that the aqueous ink obtained by the process of the present invention has a surface tension at 20° C. of from 25 to 50 dyn/cm, still preferably from 30 to 45 dyn/cm.

The aqueous ink for inkjet printing obtained by the process of the present invention is highly excellent in water resistance and can prevent scorching onto a printer head.

EXAMPLES

To further illustrate the present invention in greater detail, and not by way of limitation, the following Examples will be given.

Unless otherwise noted, all parts and % in the following Examples are by weight.

Examples 1 and 2

Into a reactor equipped with a stirrer, a reflux condenser, a dropping funnel, a thermometer and a nitrogen inlet pipe were fed 20 parts of methyl ethyl ketone as a polymerization solvent, the monomers listed as the initial feed monomers in Table 1 as polymerizable unsaturated monomers and a polymerization chain transfer agent. Then the reactor was sufficiently purged with nitrogen. Separately, the monomers listed as the dropping monomers in Table 1, a polymerization chain transfer agent, 60 parts of methyl ethyl ketone and 0.2 parts of 2,2'-azobis(2,4-dimethylvaleronitrile) were fed into the dropping funnel after sufficiently purged with nitrogen. In a nitrogen atmosphere, the mixture in the reactor was heated to 65° C. under stirring. Then the mixture in the dropping funnel was slowly dropped thereinto over 3 hours. Tow hours after the completion of the dropping, 0.1 part of 2,2'-azobis(2,4-dimetylvaleronitrile) was dissolved in 5 parts of methyl ethyl ketone and the resulting solution was added thereto. The mixture thus obtained was aged at 65° C. for 2 hours and then at 70° C. for additional 2 hours to thereby give a copolymer solution.

A portion of the copolymer solution thus obtained was dried under reduced pressure at 105° C. for 2 hours. Thus the solvent was completely removed therefrom and the copolymer was isolated. Then the molecular weight of the copolymer was measured by gel permeation chromatography with the use of polystyrene as a standard and tetrahydrofuran as a solvent. Thus it was found out that the weight-average molecular weight of the copolymer was about 10,000.

To 5 parts of the copolymer obtained by drying the copolymer solution obtained above under reduced pressure were added 25 parts of the organic solvent and 5 parts of the hydrophobic dye each shown in Table 1. After completely dissolving, 2 parts of a 30% aqueous solution of the base shown in Table 1 was further added to thereby partially neutralize the salt-forming group of the copolymer. Next, 300 parts of deionized water and 3 parts of a 25% aqueous solution of a surfactant (Emul 20C mfd. by Kao Corporation) were added thereto and the resulting mixture was stirred and then emulsified at 8500 psi for 30 minutes with a Microfluidizer (mfd. by Microfluidizer). From the emulsion thus obtained, the solvent was completely removed at 60° C. under reduced pressure. Further, the residue was concentrated by partially removing water to thereby give an aqueous dispersion of a solid concentration of 10% by weight of the vinyl polymer having the hydrophobic dye encompassed therein.

80 parts of the aqueous dispersion of the vinyl polymer thus obtained was mixed with 10 parts of N-methylglycine, 6 parts of deionized water, 4 parts of a 25% aqueous solution of a surfactant (Emul 20C mfd. by Kao Corporation) and 0.01 part of a defoaming agent (KM-71 mfd. by Shin-Etsu Silicone Co., Ltd.) to thereby give a dispersion. This dispersion was filtered through a 0.2 μm filter to thereby eliminate contaminants and coarse particles therefrom and thus an aqueous ink was obtained.

Example 7

An aqueous dispersion of a vinyl polymer having a hydrophobic dye encompassed therein was obtained by the same procedure as that of Example 1 while using Nubian Black PC-0850 (nigrosine black dye) as the hydrophobic dye. Then an aqueous ink was obtained therefrom in the same manner.

Comparative Examples 1 and 2

By using water-soluble inks employed in common inks for inkjet printing, inks were prepared in accordance with the following formulations.

TABLE 1

| | Example 1 | wt % | Example 2 | wt % |
|---|---|---|---|---|
| initially fed monomers and polymerization chain transfer agent | t-Butylmethacrylate | 11 | t-Butylmethacrylate | 9 |
| | poly(ethyleneglycol)mono methacrylate | 3 | poly(ethyleneglycol)mono methacrylate | 3 |
| | acryl acid | 3 | acryl acid | 1 |
| | silicone macromer FM-0711 | 2 | silicone macromer FM-0711 | 2 |
| | Styerene Acrynitrile macromer AN-6 | 1 | Styerene Acrynitrile macromer AN-6 | 1 |
| | | | Diacetone acryle amide | 4 |
| | n-Dodecylmercaptane | 0.6 | n-Dodecylmercaptane | 0.6 |
| dropwise added monomers and polymerization chain transfer agent | t-Butylmethacrylate | 44 | t-Butylmethacrylate | 36 |
| | poly(ethyleneglycol)mono methacrylate | 12 | poly(ethyleneglycol)mono methacrylate | 12 |
| | acryl acid | 12 | acryl acid | 4 |
| | silicone macromer FM-0711 | 8 | silicone macromer FM-0711 | 8 |
| | Styerene Acrynitrile macromer AN-6 | 4 | Styerene Acrynitrile macromer AN-6 | 4 |
| | | | Diacetone acryle amide | 16 |
| | n-Dodecylmercaptane | 2.4 | n-Dodecylmercaptane | 2.4 |
| organic solvent | toluene | | 1,2-dichloroethane | |
| base to neutralize | ammonia | | ammonia | |
| phydrophobic dye | Oil Yellow 129 (Solvent Yellow 19) | | Neopen Mazenta SE 1378 | |

Example 3

An aqueous dispersion of a vinyl polymer having a hydrophobic dye encompassed therein was obtained by the same procedure as that of Example 1 while using Vali Fast Blue 2606 (Solvent Blue 70) as the hydrophobic dye. Then an aqueous ink was obtained therefrom in the same manner.

Example 4

An aqueous dispersion of a vinyl polymer having a hydrophobic dye encompassed therein was obtained by the same procedure as that of Example 1 while using Oil Pink 312 (Solvent Red 49) as the hydrophobic dye. Then an aqueous ink was obtained therefrom in the same manner.

Example 5

An aqueous dispersion of a vinyl polymer having a hydrophobic dye encompassed therein was obtained by the same procedure as that of Example 1 while using Oil Yellow 105 (Solvent Yellow 30) as the hydrophobic dye. Then an aqueous ink was obtained therefrom in the same manner.

Example 6

An aqueous dispersion of a vinyl polymer having a hydrophobic dye encompassed therein was obtained by the same procedure as that of Example 1 while using Oil Scarlet 308 (Solvent Red 18) as the hydrophobic dye. Then an aqueous ink was obtained therefrom in the same manner.

| <Ink of Comparative Example 1> | |
|---|---|
| C.I. Direct Yellow 132 | 1.5% |
| diethylene glycol | 7.5% |
| glycerol | 2.5% |
| deionized water | 88.5% |
| <Ink of Comparative Example 2> | |
| C.I. Acid Red 52 | 1.5% |
| triethylene glycol | 10% |
| 1,2,6-hexanetriol | 5% |
| deionized water | 83.5% |

Comparative Example 3

An aqueous dispersion of a vinyl polymer having a hydrophobic dye encompassed therein was produced by the same procedure as that of Example 1 while using acetone as a substitute for toluene as the organic solvent for emulsification and an aqueous ink was obtained in the same manner therefrom, though a large amount of insoluble dye crystals were formed in the step of the removal of acetone.

The physical properties of the aqueous inks obtained in the above Examples 1 to 7 and Comparative Examples 1 to 3 were evaluated by the following procedures. Table 2 summarizes the results.

<Evaluation Procedure>

(1) Print Density

Solid printing was effected on a reclaimed PPC paper sheet by using a commercially available microbubble jet printer (Model BJ-10vL mfd. by Canon Inc.). Then its optical density was measured with a Macbeth densitometer RD918 (mfd. by Macbeth Co., Ltd.).

(2) Water Resistance

Solid printing was effected on a reclaimed PPC paper sheet by using the above-mentioned printer. After allowing to stand for 1 hour or longer, the sheet was vertically immersed into still water for 1 hour and then vertically pulled up as such. After spontaneously drying at room temperature, the print density of the same printed letters was measured by the above-mentioned Macbeth densitometer and the water resistance was determined in accordance with the following formula:

$$\text{water resistance (\%)} = \frac{\text{print density after immersion}}{\text{print density before immersion}} \times 100.$$

(3) Scorching Resistance

Solid printing was effected on five A4-sized sheets of reclaimed PPC paper by using the above-mentioned printer. Then the heating unit in the ink cartridge was microscopically observed and the degree of scorching of the ink was evaluated in accordance with the following criteria.

○: no adhesion of scorching.

Δ: slight adhesion of scorching.

x: noticeable adhesion of scorching.

(4) Average Particle Size

The average particle size was measured by using a Coulter Counter N4 (mfd. by Coulter) as a size-measuring equipment.

unsaturated monomer (b) and a monomer (c) copolymerizable with the above-mentioned monomers:

$$X(Y)_n Si(R)_{3-m}(Z)_m \quad (1)$$

wherein X represents a polymerizable unsaturated group; Y represents a divalent bonding group; the plurality of Rs may be the same or different and each represents a hydrogen atom, a lower alkyl group, an aryl group or an alkoxy group; Z represents a monovalent siloxanepolymer group having a number-average molecular weight of at least about 500; n is 0 or 1; and m is an integer of 1 to 3.

3. A process as set forth in claim 1 or 2 wherein the weight-average molecular weight of said salt-forming group-having polymer falls within the range of from 3,000 to 80,000.

4. A process as set forth in claim 1 wherein the particle size of said polymer particles having a hydrophobic dye encompassed therein is from 0.01 to 0.5 μm.

5. A process as set forth in claim 1 wherein said water-insoluble organic solvent is an organic solvent having a solubility in water of 3% by weight or less.

6. A process as set forth in claim 1 wherein said water-insoluble organic solvent is an aromatic solvent or a halogenated aliphatic solvent.

7. A process as set forth in claim 1 wherein said hydrophobic dye is one selected from among C.I. Solvent Yellow 29 and 30, C.I. Solvent Blue 70, C.I. Solvent Red 18 and 49 and C.I. Solvent Black 3 and nigrosine black dyes.

TABLE 2

|  | Example 1 | Example 2 | Example 3 | Example 4 | Example 5 | Example 6 | Example 7 | Comp. Example 1 | Comp. Example 2 | Comp. Example 3 |
|---|---|---|---|---|---|---|---|---|---|---|
| Print density | 1.19 | 1.28 | 1.26 | 1.29 | 1.27 | 1.28 | 1.14 | 1.31 | 1.28 | 0.52 |
| Water resistance (%) | 100 | 100 | 100 | 100 | 100 | 100 | 100 | 35 | 42 | 100 |
| Scorching resistance | ○ | ○ | ○ | ○ | ○ | ○ | ○ | ○ | ○ | ○ |
| Average particle size (nm) | 40 | 37 | 40 | 45 | 46 | 45 | 45 | — | — | 150 |

We claim:

1. A process for producing an aqueous ink for an inkjet printing, which comprises the steps of dissolving a salt-forming group-having polymer and a hydrophobic dye in a water-insoluble, organic solvent to obtain a solution, adding water and a neutralizing agent to the solution to ionize the salt-forming group of the polymer, emulsifying the resulting mixture and removing out the solvent from the emulsion to obtain an aqueous dispersion of the polymer particles in which the dye has been encompassed.

2. A process as set forth in claim 1 wherein said salt-forming group-having polymer is a vinyl polymer obtained by copolymerizing in the presence of a radical polymerization inititor, at least one monomer (a) selected from the group consisting of a silicone macromer represented by the following formula (1), an acrylamide monomer and a methacrylamide monomer, excluding those having salt-forming groups, with a salt-forming group-having polymerizable 8. A process as set forth in claim 1 wherein the content of said hydrophobic dye ranges from 50 to 200% by weight based on the salt-forming group-having polymer.

9. A process as set forth in claim 1 wherein said salt-forming group is —COOH.

10. A process as set forth in claim 1 wherein a surfactant is added together with water and a neutralizing agent.

11. An aqueous ink for inkjet printing prepared by a process comprising:

i) dissolving a salt-forming group-having polymer and a hydrophobic dye in a water-insoluble, organic solvent to obtain a solution;

ii) adding water and a neutralizing agent to said solution to ionize the salt-forming group of said polymer;

iii) emulsifying the resulting mixture; and iv) removing said organic solvent from the emulsion to obtain an aqueous dispersion of said polymer particles in which said dye has been encompassed.

* * * * *

UNITED STATES PATENT AND TRADEMARK OFFICE
CERTIFICATE OF CORRECTION

PATENT NO. : 5,998,501

DATED : December 7, 1999

INVENTOR(S): Takehiro TSUTSUMI et al.

It is certified that an error appears in the above-identified patent and that said Letters Patent is hereby corrected as shown below:

On the title page, item [75], the 1st Inventor's name is misspelled.
Item [75] should read:

[75] Inventors: Takehiro Tsutsumi; Koji Azuma;
Michitaka Sawada, all of Wakayama, Japan Signed and Sealed this Seventeenth Day of April, 2001

*Attest:*

NICHOLAS P. GODICI

*Attesting Officer*  *Acting Director of the United States Patent and Trademark Office*